US006708600B2

(12) United States Patent
Winkler et al.

(10) Patent No.: US 6,708,600 B2
(45) Date of Patent: Mar. 23, 2004

(54) PUNCTURING AND VENTING OF SINGLE SERVE BEVERAGE FILTER CARTRIDGE

(75) Inventors: Karl T. Winkler, Bedford, MA (US); Jason F. Lipman, Acton, MA (US); Jon Taylor, Groton, MA (US); Philip C. Walker, Concord, MA (US)

(73) Assignee: Keurig, Incorporated, Wakefield, MA (US)

( * ) Notice: Subject to any disclaimer, the term of this patent is extended or adjusted under 35 U.S.C. 154(b) by 0 days.

(21) Appl. No.: 10/113,185

(22) Filed: Apr. 1, 2002

(65) Prior Publication Data

US 2002/0144604 A1 Oct. 10, 2002

Related U.S. Application Data

(60) Provisional application No. 60/282,019, filed on Apr. 6, 2001.

(51) Int. Cl.$^7$ ................................................ A47J 31/00
(52) U.S. Cl. ....................................... 99/295; 99/302 R
(58) Field of Search .............................. 99/295, 302 R, 99/300, 279, 275; 426/433, 435, 77

(56) References Cited

U.S. PATENT DOCUMENTS

| 3,470,812 | A | * | 10/1969 | Levinson | 99/295 |
| 5,008,013 | A | * | 4/1991 | Favre et al. | 99/295 X |
| 5,111,740 | A | | 5/1992 | Klein | 99/295 |
| 5,398,596 | A | * | 3/1995 | Fond | 99/295 |
| 5,472,719 | A | | 12/1995 | Favre | 426/77 |
| 5,826,492 | A | * | 10/1998 | Fond et al. | 99/295 |

FOREIGN PATENT DOCUMENTS

DE        1256247        8/1972

* cited by examiner

*Primary Examiner*—Reginald L. Alexander
(74) *Attorney, Agent, or Firm*—Samuels, Gauthier & Stevens

(57) ABSTRACT

A liquid inlet probe for piercing the lid of a beverage filter cartridge comprises a cylindrical inner hub surrounded by an enlarged diameter outer sleeve. Support ribs extend radially between and coact with the exterior of the hub and the interior of the sleeve to define a plurality of liquid supply passages. The hub, ribs and sleeve having bevelled lower ends arranged in a truncated conical alignment converging towards the center of the probe to a pointed end projecting downwardly from its lower end.

3 Claims, 4 Drawing Sheets

PUNCTURING AND VENTING OF SINGLE SERVE BEVERAGE FILTER CARTRIDGE

CROSS REFERENCE TO RELATED APPLICATION

This application claims priority of Provisional Patent Application Serial No. 60/282,019 filed Apr. 6, 2001.

BACKGROUND DISCUSSION

1. Field of the Invention

This invention relates generally to single serve beverage brewers, and is concerned in particular with an improved inlet probe for puncturing and venting single serve beverage filter cartridges utilized in the brew cycles of such brewers.

2. Description of the Prior Art

It is known, as disclosed for example in U.S. Pat. Nos. 5,325,765 (Sylvan et al.) and 5,840,189 (Sylvan et al.) to employ sharpened tubular inlet probes to puncture the lids of single serve beverage filter cartridges. While such devices operate in a generally satisfactory manner, experience has indicated that that interiors of the cartridges often become pressurized as a result of temperature changes and/or outgassing of the beverage medium. If the internal pressure is relieved by venting through the inlet probe, particles of the beverage medium may be entrained with the exiting gas, causing clogging of the probe and a malfunction of the brewer.

SUMMARY OF THE INVENTION

The objective of the present invention is to avoid or at least significantly minimize this problem by providing an improved probe that operates in a single downward stroke to pierce the cartridge lid, and to divert vented gases and any entrained particles away from the probe's inlet passages as the inlet passages are placed in communication with the cartridge interior.

These and other objectives, features and advantages of the present invention will now be described in greater detail with reference to the accompanying drawings, wherein:

BRIEF DESCRIPTION OF THE DRAWINGS

FIGS. 5A–7A are views taken respectively along lines 5A—5A, 6A—6A and 7A—7A of FIGS. 5–7.

Figure 1:
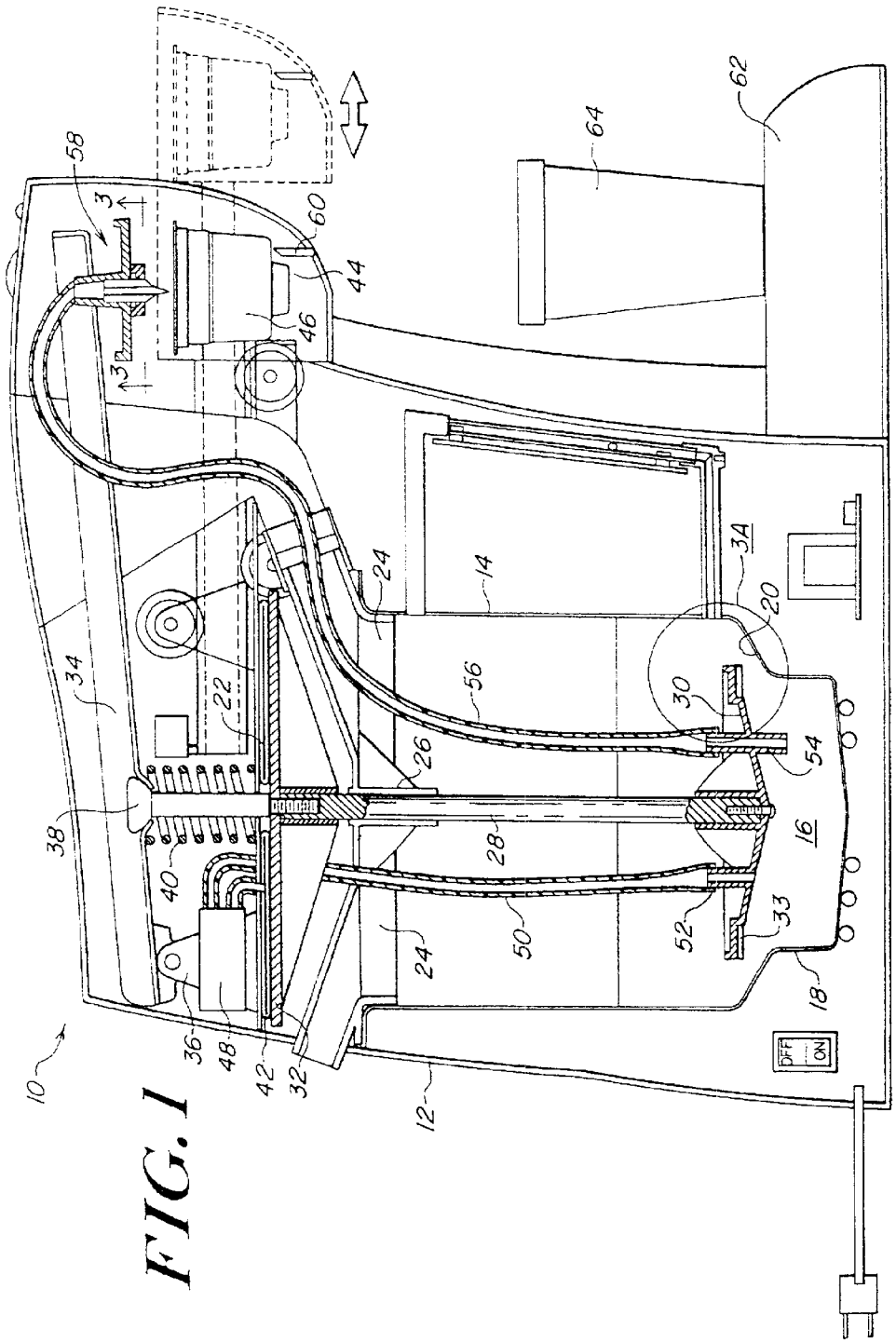
FIG. 1 is a vertical sectional view taken through a single serve beverage brewer having a liquid dispensing system and associated inlet probe embodying the concepts of the present invention, with the dispensing system shown in a "ready" state prior to commencement of a brew cycle.

With reference initially to FIG. 1, a single serve brewer 10 includes a housing 12 containing a liquid storage tank 14. The tank has a lower metering chamber 16 formed by a reduced diameter cup-shaped bottom 18 integrally joined to the larger diameter tank side wall at a circular sealing surface defining a seat 20.

A fixed internal structure includes a horizontal platform 22 and struts 24 supporting a vertically disposed sleeve bearing 26 aligned centrally with respect to the tank 14 and its cup-shaped bottom 18.

A vertically reciprocal shaft 28 extends through the sleeve bearing 26. The shaft carries a generally conically shaped baffle 30 at its lower end, and a circular plate 32 disposed beneath the platform 22. A resilient and compressible circular gasket 33 on the lower surface of the baffle overlies the seat 20.

An arm 34 is pivotally mounted on a bracket 36 carried by the platform 22. Arm 34 is connected to the shaft 28 by a pin 38. A coiled spring 40 surrounds the pin 38 between the arm 34 and the upper surface of platform 22, and an inflatable bladder 42 is positioned between the bottom surface of the platform 22 and the plate 32.

The distal end of arm 34 extends into a brewing chamber 44 designed to accept a single serve beverage filter cartridge 46 of the type described in copending patent application Ser. No. 09/782,622 filed Feb. 13, 2001, the description of which is herein incorporated by reference in its entirety.

An air pump 48 on platform 22 is connected to the bladder 42, and is also connected via a flexible hose 50 to a port 52 in the baffle 30. A metering tube 54 extends through the baffle 30 into the chamber 16. The metering tube 54 is connected via a second flexible hose 56 to a depending inlet probe 58 in accordance with the present invention and carried at the distal end of the arm 34. A second tubular outlet probe 60 underlies the cartridge 46 and opens downwardly above an exterior shelf 62 configured and dimensioned to support a cup 64 or other like receptacle.

Figure 2:
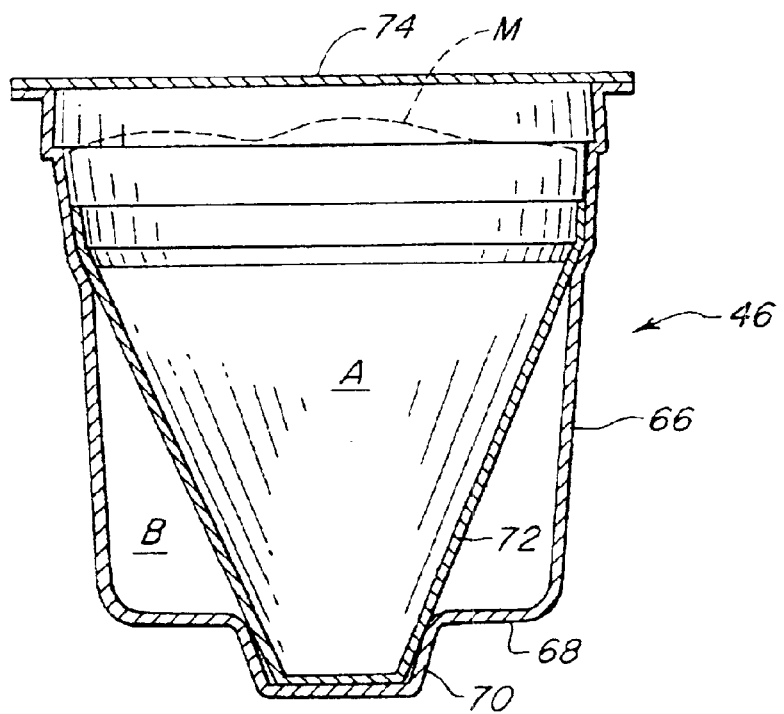
FIG. 2 is an enlarged vertical sectional view taken through a typical beverage filter cartridge of the type shown in FIG. 1.

As shown in FIG. 2, the beverage filter cartridge 46 includes a cup-shaped container 66 having a bottom 68 configured with a depending reduced diameter well 70. The interior of the container is subdivided by a cone-shaped permeable filter 72 into first and second chambers A, B. The bottom of the filter is received in and fixed to the bottom of the well 70. A dry beverage medium "M", typically ground roasted coffee, is stored in the chamber A, after which oxygen is purged from the container interior by the introduction of an inert gas, typically nitrogen. The top of the container is then closed by a lid 74. Both the container and the lid are formed of impermeable yieldably piercable materials.

Figure 3:
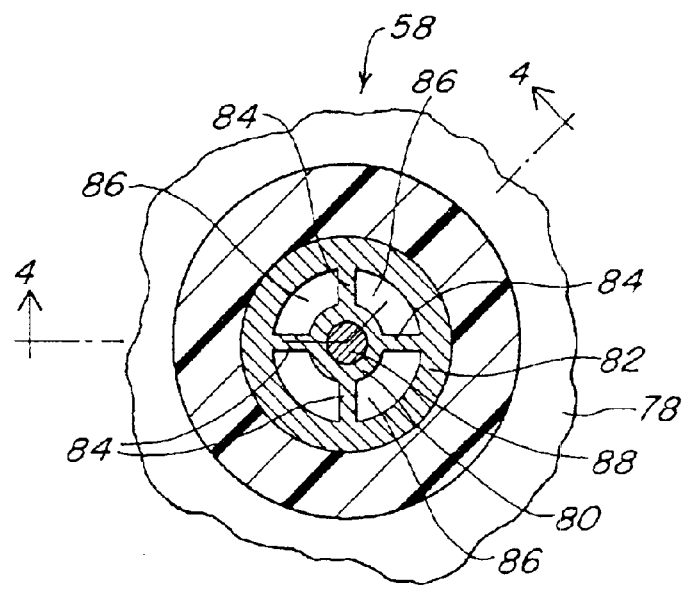
FIG. 3 is an enlarged horizontal sectional view taken along line 3—3 of FIG. 1.
Figure 4:
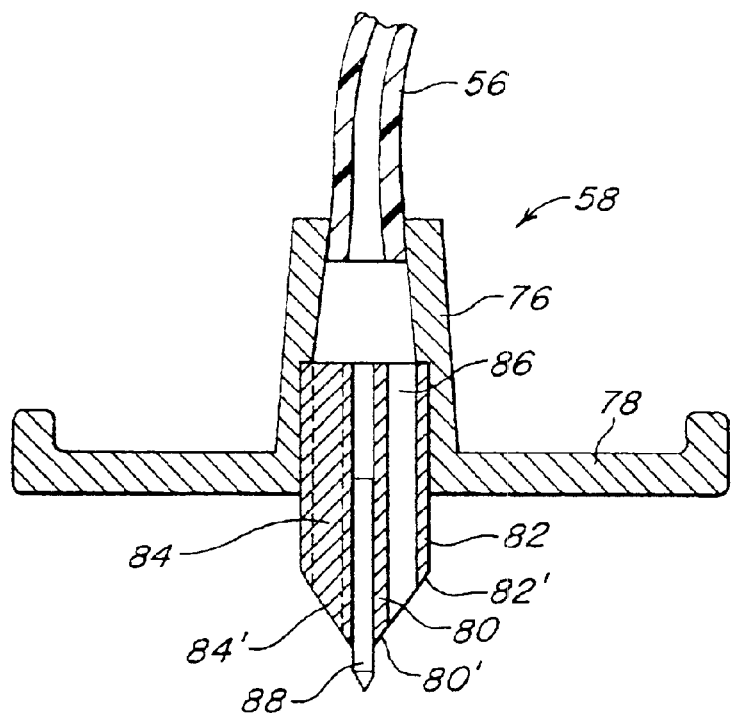
FIG. 4 is a sectional view taken along line 4—4 of FIG. 3.

As can best be seen by a combined reference to FIGS. 3 and 4, the inlet probe 58 depends from a tubular head 76 surrounded by an integral horizontal platen 78. The probe includes a cylindrical inner hub 80 supported within an enlarged diameter outer sleeve 82 by radial support ribs 84 angularly spaced one from the other. The ribs 84 coact with the outer surface of hub 80 and the inner surface of sleeve 82 to define a plurality of liquid supply channels 86 communicating with the hose 56 connected to head 76. The hub 80, ribs 84 and sleeve 82 have respective bevelled lower ends 80', 84' and 82' arranged in a truncated conical alignment converging towards the center of the probe. A solid sharpened pin 88 protrudes downwardly from the bevelled lower end 80' of the hub 80. The outer sleeve 82 is surrounded by a sealing gasket 90 on the bottom surface of the platen 78.

Figure 5:
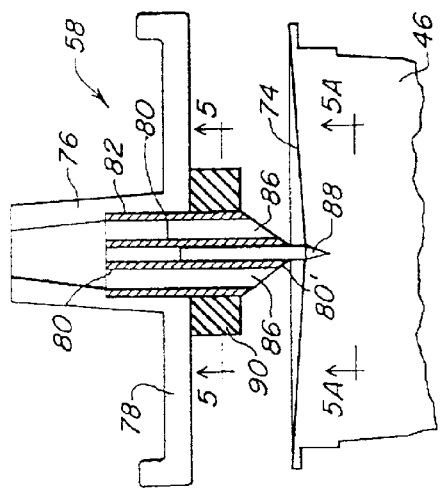
FIGS. 5–7 are views showing successive stages in the puncturing and venting cycle of the present invention.
Figure 5A:
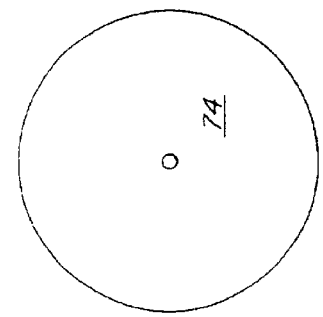

As shown in FIGS. 5 and 5A, at the outset of the puncturing and venting process, pin 88 initially punctures the lid 74. At this stage, the pin is tightly surrounded by the lid material, thus preventing gas from escaping from the container interior.

Figure 6:
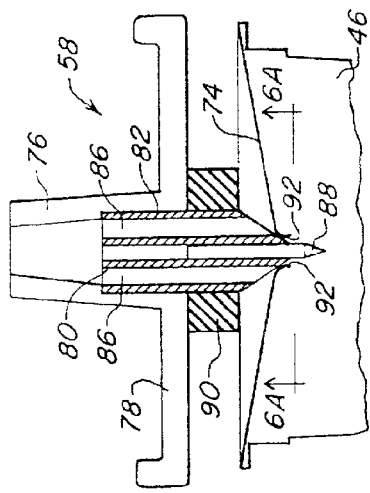
Figure 6A:
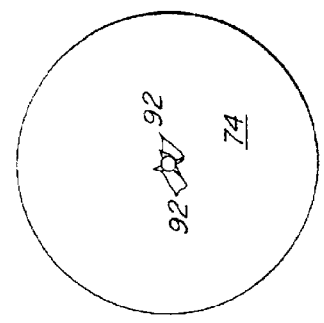

As the probe 58 continues its downward penetration, and as shown in FIGS. 6 and 6A, the bevelled lower end 80' of hub 80 enlarges the aperture initially created by the pin 88, creating fissures 92 in the lid material. Gas is vented through the fissures and, together with any entrained beverage medium particles, is harmlessly directed away from the liquid inlet passages 86 by the bevelled lower ends 80', 84' of the hub 80 and support ribs 84.

Figure 7:
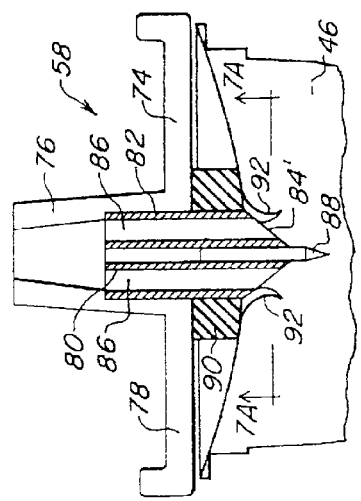
Figure 7A:
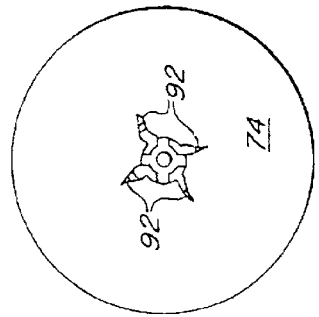

As the probe continues downwardly to its lowermost position, as shown in FIGS. 7 and 7A, the fissures are enlarged sufficiently by the bevelled lower edges 84' of the support ribs 84 to establish communication with the channels 86, thereby accommodating introduction of liquid into the cartridge interior. At this stage, the gasket 90 is compressed between the platen 78 and lid 74 to prevent liquid from escaping from between the probe and the punctured lid.

It thus will be seen that the puncturing cycle is performed in a single step by gradually lowering the probe from its elevated withdrawn position above the cartridge lid, as shown in FIG. 1, to its lowered full penetration position shown in FIGS. 7 and 7A. Vented gases and entrained particles are diverted away from the liquid supply passages, thus safeguarding the probe from contamination and clogging.

During a brew cycle, a control system including appropriate valves and circuiting (not shown) operates air pump 48 to initially inflate bladder 42, causing the arm 34 to be lowered against the force of spring 40, and thus lowering the probe 58 through the puncturing cycle. The metering chamber 16 is then pressurized to direct heated liquid via hose 50 and probe 58 into the cartridge for infusion with the beverage medium contained therein. The resulting brewed beverage exits the cartridge via outlet probe 60 into cup 64.

At the conclusion of the brew cycle, the bladder 42 is deflated, allowing the arm 34 to be raised by the force of spring 40 to effect extraction of the inlet probe from the cartridge lid.

Various modifications may be made to the embodiment herein chosen for purposes of disclosure without departing from the spirit and scope of the invention as encompassed by the appended claims. Non limiting examples of such modifications include replacing the sharpened pin 88 by a pointed molded extension of the hub 80; fixing the inlet probe 58 and raising the cartridge to effect the piercing cycle; and employing separately operable air pumps to inflate the bladder 42 and pressurize the metering chamber 16.

We claim:

1. A liquid inlet probe for piercing the lid of a beverage filter cartridge, said probe comprising:

a cylindrical inner hub surrounded by an enlarged diameter outer sleeve;

support ribs extending radially between and coacting with the exterior of said hub and the interior of said sleeve to define a plurality of liquid supply passages; said hub, ribs and sleeve having bevelled lower ends arranged in a truncated conical alignment converging towards the center of said probe; and a pointed end projecting downwardly from the lower end of said hub.

2. The liquid inlet probe of claim 1 wherein said outer sleeve is received in and projects downwardly from a tubular head surrounded by an integral annular plate, said tubular head defining a conduit communicating with said passages and adapted for connection to a liquid supply.

3. The liquid inlet probe of claim 1 wherein said outer sleeve is surrounded by a sealing gasket.

* * * * *